(12) United States Patent
Xie et al.

(10) Patent No.: US 9,134,872 B2
(45) Date of Patent: Sep. 15, 2015

(54) TOUCH SCREEN, COLOR FILTER SUBSTRATE AND MANUFACTURING METHOD THEREOF

(75) Inventors: Zhenyu Xie, Beijing (CN); Xiang Liu, Beijing (CN); Xu Chen, Bejing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 1036 days.

(21) Appl. No.: 12/879,185

(22) Filed: Sep. 10, 2010

(65) Prior Publication Data

US 2011/0063239 A1   Mar. 17, 2011

(30) Foreign Application Priority Data

Sep. 11, 2009   (CN) .......................... 2009 1 0092943

(51) Int. Cl.
  *G06F 3/041*   (2006.01)
  *G06F 3/045*   (2006.01)

(52) U.S. Cl.
  CPC .............. *G06F 3/045* (2013.01); *G06F 3/0414* (2013.01); *Y10T 29/49124* (2015.01)

(58) Field of Classification Search
  CPC ..... G06F 3/041; G06F 3/0412; G06F 3/0414; G06F 3/0416; G06F 2203/04111; G06F 2203/04112; G06F 3/045; Y10T 29/49124
  USPC ...................... 178/18.01–18.08; 345/173–184
  See application file for complete search history.

(56) References Cited

U.S. PATENT DOCUMENTS

| 4,328,441 A | 5/1982 | Kroeger, Jr. et al. |
| 5,729,034 A * | 3/1998 | Park ............................... 257/296 |

(Continued)

FOREIGN PATENT DOCUMENTS

| CN | 1487399 A | 4/2004 |
| CN | 101158764 A | 4/2008 |

(Continued)

OTHER PUBLICATIONS

USPTO NFOA dated Nov. 23, 2012 in connection with U.S. Appl. No. 12/782,218.

(Continued)

*Primary Examiner* — Larry Sternbane
(74) *Attorney, Agent, or Firm* — Ladas & Parry LLP (57) ABSTRACT

A touch screen, a color filter substrate and a manufacture method thereof are provided in the embodiment of the invention. The touch screen comprises a substrate; a plurality of first signal lines and a plurality of second signal lines forming on the substrate and intersecting with each other to define a plurality of touch regions; a plurality of sensing electrodes, each of the sensing electrodes being connected between one first signal line and one second signal line. Charges are generated on at least one of the sensing electrodes when the sensing electrode is pressed, so that detecting signals for determining coordinates of a touch point are generated on the first signal line and the second signal line that correspond to the sensing electrode.

11 Claims, 7 Drawing Sheets

(56) References Cited

U.S. PATENT DOCUMENTS

| | | | |
|---|---|---|---|
| 7,339,564 B2* | 3/2008 | Hashimoto et al. | 345/87 |
| 2004/0032401 A1 | 2/2004 | Nakazawa et al. | |
| 2008/0018613 A1* | 1/2008 | Kim et al. | 345/173 |
| 2008/0158199 A1* | 7/2008 | Lee et al. | 345/174 |
| 2008/0174851 A1 | 7/2008 | Kawai | |
| 2009/0179523 A1 | 7/2009 | Wang et al. | |
| 2009/0262096 A1 | 10/2009 | Teramoto | |
| 2009/0322702 A1 | 12/2009 | Chien et al. | |
| 2010/0194697 A1* | 8/2010 | Hotelling et al. | 345/173 |
| 2010/0321327 A1* | 12/2010 | Liu | 345/174 |

FOREIGN PATENT DOCUMENTS

| | | |
|---|---|---|
| CN | 101201525 A | 6/2008 |
| CN | 101276252 A | 10/2008 |

OTHER PUBLICATIONS

USPTO FOA dated Jun. 13, 2013 in connection with U.S. Appl. No. 12/782,218.

USPTO NFOA dated Feb. 21, 2014 in connection with U.S. Appl. No. 12/782,218.

* cited by examiner

TOUCH SCREEN, COLOR FILTER SUBSTRATE AND MANUFACTURING METHOD THEREOF

BACKGROUND

Embodiments of the present invention relate to a touch screen, a color filter substrate and the manufacturing methods thereof.

Touch screens can be constructed in different ways and sorted into inductance type, capacitance type and resistance type according to the operation principle. The resistance type touch screen mainly comprises a resistance thin film closely mated with the surface of a display. During operation, the resistance thin film and the display cooperate with each other. When the coordinates of the touch point on the display are determined, the intention of the user can be accordingly determined on the basis of the display content or image corresponding to the above coordinates. Presently, in a liquid crystal display with touch function, the touch screen is overlapped on the liquid crystal display.

SUMMARY

According to an aspect of the invention, a touch screen is provided. The touch screen comprises a substrate; a plurality of first signal lines and a plurality of second signal lines forming on the substrate and intersecting with each other to define a plurality of touch regions; a plurality of sensing electrodes, each of the sensing electrodes being connected between one first signal line and one second signal line, wherein charges are generated on at least one of the sensing electrodes when the sensing electrode is pressed, so that detecting signals for determining coordinates of a touch point are generated on the first signal line and the second signal line that correspond to the sensing electrode.

According to another aspect of the invention, a color filter substrate is provided in the invention. The color filter substrate comprises a touch structural layer and a color filter structural layer forming on the touch structural layer. The touch structural layer comprises a substrate; a plurality of first signal lines and a plurality of second signal lines forming on the substrate and intersecting with each other to define a plurality of touch regions; a plurality of sensing electrodes, each of the sensing electrodes being connected between one first signal line and one second signal line, wherein charges are generated on at least one of the sensing electrodes when the sensing electrode is pressed, so that detecting signals for determining coordinates of a touch point are generated on the first signal line and the second signal line that correspond to the sensing electrode.

According to still another aspect of the invention, a method of manufacturing a touch screen is provided. The method comprises: Step 1 of forming a plurality of first signal lines and a plurality of sensing electrodes on a substrate, wherein each of the sensing electrodes is connected with one first signal line; and Step 2 of forming a plurality of second signal lines, wherein each of the second signal lines is connected with corresponding sensing electrodes and intersects with the first signal lines to define a plurality of touch regions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Hereinafter, the embodiments of the invention will be described in detail with reference to the accompanying drawings.

Figure 1:
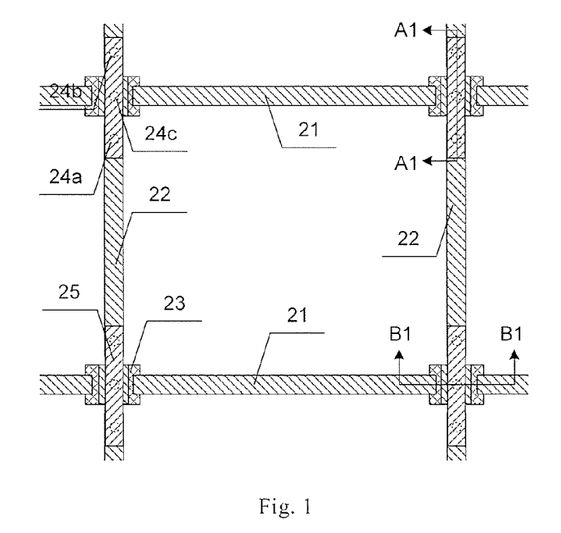
FIG. 1 is a view showing a first embodiment of a touch screen according to the invention.
Figure 2:
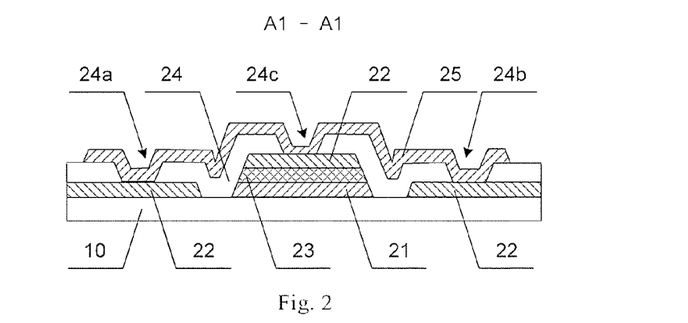
FIG. 2 is a sectional view taken along line A1-A1 in FIG. 1.

FIG. 1 is a view showing a first embodiment of a touch screen according to the invention, in which only one touch region is shown. FIG. 2 is a sectional view taken along line A1-A1 in FIG. 1, and FIG. 3 is a sectional view taken along line B1-B1 in FIG. 1.

Figure 3:
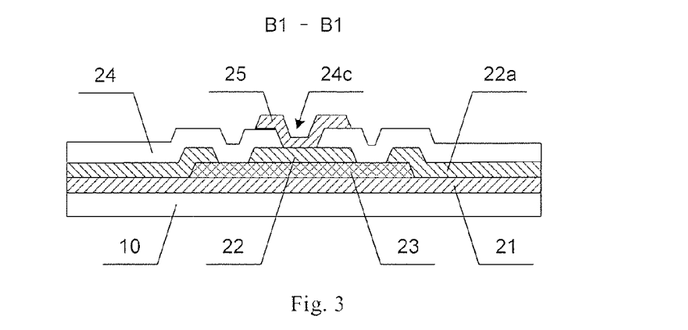
FIG. 3 is a sectional view taken along line B1-B1 in FIG. 1.

As shown in FIG. 1 and FIG. 3, the main body of the touch screen in this embodiment comprises a plurality of first signal lines 21 which horizontally extend, a plurality of second signal lines 22 which vertically extend, and a plurality of sensing electrodes 23. The first signal lines 21, the second signal lines 22 and the sensing electrodes 23 are formed on a substrate 10. A plurality of touch regions are defined by the first signal lines 21 and the second signal lines 22 intersecting with each other. Each of the sensing electrodes is formed in the overlapping region of one first signal line 21 and one second signal line 22 and is provided between this first signal line 21 and this second signal line 22 along the thickness direction of the touch screen. Thus, each of the sensing electrodes 23 is connected with the corresponding first signal line 21 and the corresponding second signal line 22, respectively. The first signal lines 21 have an integral and continuous structure. The sensing electrode 23 is provided on the first signal line 21 correspondingly. The second signal lines 22 have a separate and discontinuous structure, and each comprise first segments and second segments. Each first segment of one second signal line 22 is provided between two adjacent first signal lines 21, and each second segment of this second signal line 22 is provided on the corresponding sensing electrode 23. The first and second segments of the second signal line 22 are connected with each other through connection bars 25. The connection bars 25 are provided above the corresponding sensing electrodes 23.

In this embodiment, the first signal lines, the second signal lines and the sensing electrodes are formed on the substrate as described above, and the sensing electrodes are formed by a piezoelectric material. Charges can be formed on the surface of the sensing electrode when the sensing electrode is pressed, and thus the coordinates of touch region (i.e., the coordinates of the touch point) can be determined by making use of the formed charges. Specifically, during operation, the first signal lines are connected with a detecting device, and the second signal lines are connected with a detecting device also. When the touch screen is not touched, the sensing electrodes are in an insulating state, and at this time, no detecting signals are generated in the first signal lines and the second signal lines. When the touch screen is touched by an object (such as a user's finger), the pressure from the object applied to the touch screen is transferred to the sensing electrode(s), charges are generated on the surface of the sensing electrode(s) under such pressure so that the sensing electrode(s) becomes conductive, and thus a detecting signal is formed in the corresponding first signal line and the corresponding second signal line and detected by the detecting devices. If the plurality of first signal lines extended in the horizontal direction are labeled with row numbers and the plurality of second signal lines extended in the longitudinal direction are labeled with column numbers, the row number corresponding to the touch point (touch region) can be determined by the detecting signal output from the first signal line in certain row (or rows) and the column number corresponding to the touch point can be determined by the detecting signal output from the second signal line in certain column (or columns), and accordingly the coordinates of the touch point can be determined on the basis of the obtained row number and column number.

In this embodiment, the piezoelectric material for forming the sensing electrodes may be $PbZrTiO_3$ (PZT), zinc oxide (ZnO), aluminum nitride (AlN) and the like, for example. In addition, in this embodiment, each of the touch regions is regarded as a basic unit, and the area thereof influences the precision of the touch screen. On the substrate with a given area, if the number of the touch regions defined by the first and second signal lines is increased, the area of each touch region is decreased and accordingly the precision of the touch screen is improved.

FIG. 4 to FIG. 17 are views showing the manufacture process of the touch screen in the first embodiment. In the following descriptions, the employed patterning process typically comprises applying photoresist, masking, exposing and developing of photoresist, etching, removing the photoresist layer and the like.

Figure 4:
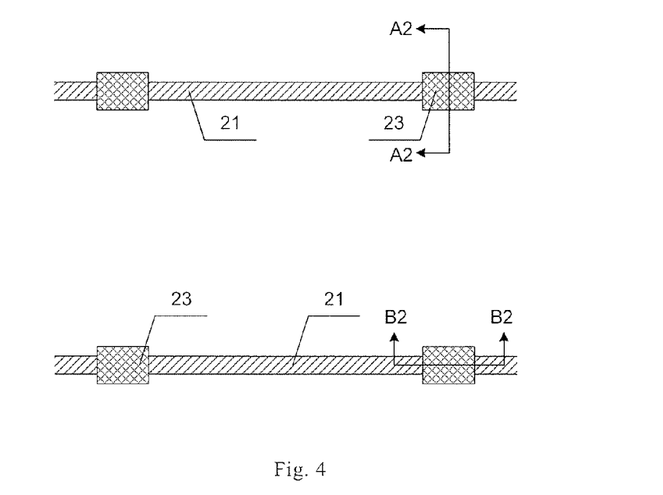
FIG. 4 is a plan view after a first patterning process in the first embodiment of the touch screen according to the invention.
Figure 5:
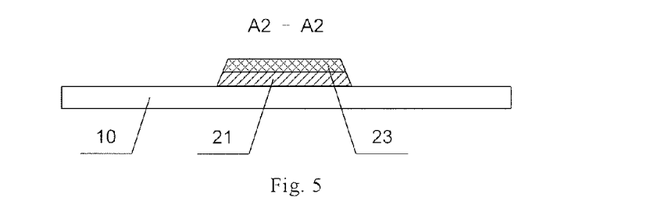
FIG. 5 is a sectional view taken along line A2-A2 in FIG. 4.
Figure 6:
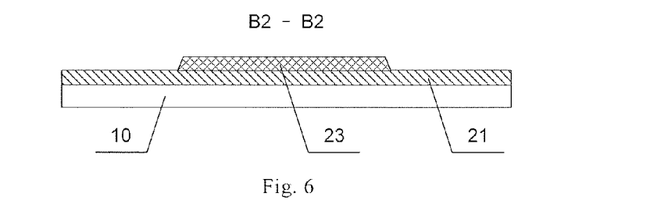
FIG. 6 is a sectional view taken along line B2-B2 in FIG. 4.

FIG. 4 is a plan view after a first patterning process in the first embodiment of the touch screen according to the invention, in which only one touch region is shown. FIG. 5 is a sectional view taken along line A2-A2 in FIG. 4, and FIG. 6 is a sectional view taken along line B2-B2 in FIG. 4.

Firstly, a first metal film is deposited on the substrate 10 (such as glass substrate or a quartz substrate) by a magnetron sputtering method or a thermal evaporation method. The first metal film may be a single-layer film or a composite film of multiple layers. Then, a piezoelectric film is deposited by a metal organic chemical vapor deposition (PECVD) method. The first signal lines 21 and the sensing electrodes 23 are formed on the substrate 10 by a patterning process with a half-tone mask or a gray-tone mask. The first signal lines 21 are horizontally provided and have an integral and continuous structure, and the sensing electrodes 23 are respectively formed on the first signal lines 21, as shown in FIG. 4 to FIG. 6. This patterning process may be performed by a multiple-etching process, and the details thereof will be described as follows.

Figure 7:
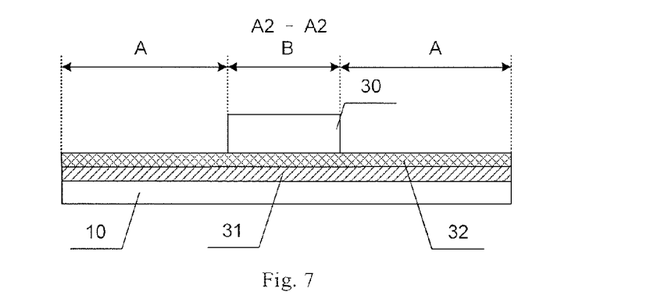
FIG. 7 is a sectional view taken along line A2-A2 after a photoresist layer is exposed and developed in the first patterning process in the first embodiment of the touch screen according to the invention.
Figure 8:
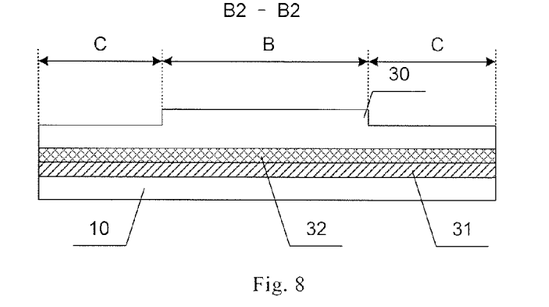
FIG. 8 is a sectional view taken along line B2-B2 after the photoresist layer is exposed and developed in the first patterning process in the first embodiment of the touch screen according to the invention.

FIG. 7 is a sectional view taken along line A2-A2 after a photoresist layer is exposed and developed in the first patterning process in the first embodiment of the touch screen according to the invention; and FIG. 8 is a sectional view taken along line B2-B2 after the photoresist layer is exposed and developed in the first patterning process in the first embodiment of the touch screen according to the invention. The first metal film 31 and the piezoelectric film 32 are sequentially deposited on the substrate 10. A photoresist layer 30 is applied on the piezoelectric film 32. The photoresist layer 30 is exposed by using a half-tone mask or a gray-tone mask, and then the photoresist layer 30 is developed to form a completely exposed region A (i.e., a photoresist-completely-removed region), an unexposed region B (i.e., a photoresist-completely-remained region) and a partially exposed region C (i.e., a photoresist-partially-remained region). The unexposed region B corresponds to the region of the sensing electrodes, the partially-exposed region C corresponds to the region of the first signal lines other than the sensing electrodes, and the completely exposed region A corresponds to the region other than the above regions, as shown in FIG. 7 and FIG. 8.

Figure 9:
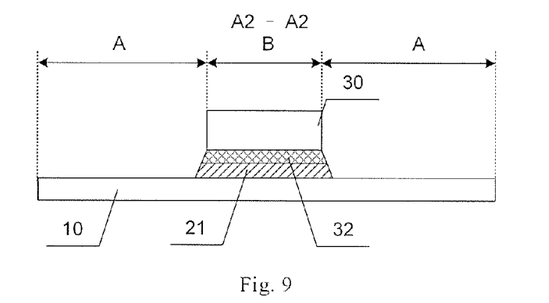
FIG. 9 is a sectional view taken along line A2-A2 after a first etching process in the first patterning process in the first embodiment of the touch screen according to the invention.

FIG. 9 is a sectional view taken along line A2-A2 after a first etching process in the first patterning process in the first embodiment of the touch screen according to the invention. By the first etching process, the piezoelectric film and the first metal film in the completely exposed region A are etched away to form the first signal lines 21, as shown in FIG. 9.

Figure 10:
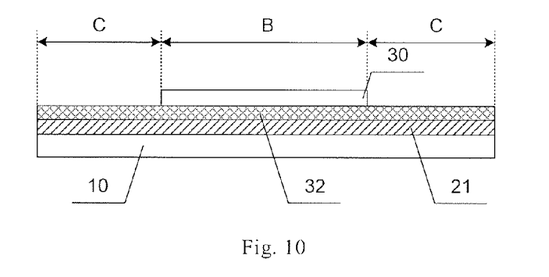
FIG. 10 is a sectional view taken along line B2-B2 after a first ashing process in the first patterning process in the first embodiment of the touch screen according to the invention.

FIG. 10 is a sectional view taken along line B2-B2 after a first ashing process in the first patterning process in the first embodiment of the touch screen according to the invention. By the ashing process, the photoresist layer 30 in the partially exposed region C is removed to expose the piezoelectric film 32, but the photoresist layer 30 is reduced in thickness but retained in the unexposed region B, as shown in FIG. 10.

Figure 11:
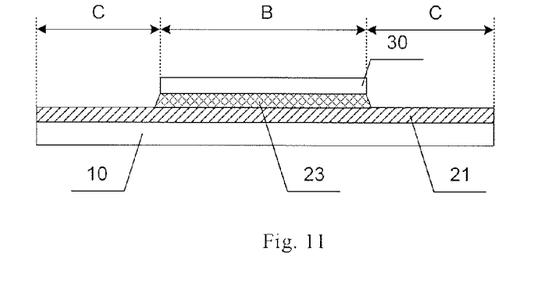
FIG. 11 is a sectional view taken along line B2-B2 after a second etching process in the first patterning process in the first embodiment of the touch screen according to the invention.

FIG. 11 is a sectional view taken along line B2-B2 after a second etching process in the first patterning process in the first embodiment of the touch screen according to the invention. By the second etching process, the piezoelectric film in the partially exposed region C is etched away to form the sensing electrodes 23, as shown in FIG. 11.

Then, the remaining photoresist layer is removed and the first patterning process in the first embodiment is completed. The pattern formed in the first patterning process in the first embodiment is shown in FIG. 4 to FIG. 6.

Figure 12:
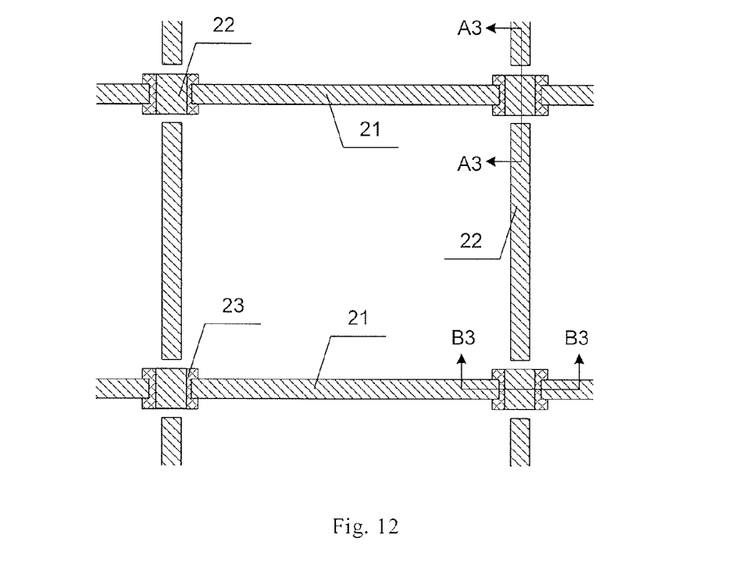
FIG. 12 is a plan view after a second patterning process in the first embodiment of the touch screen according to the invention.
Figure 13:
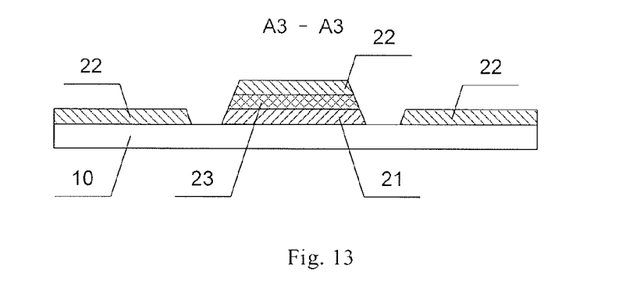
FIG. 13 is a sectional view taken along line A3-A3 in FIG. 12.
Figure 14:
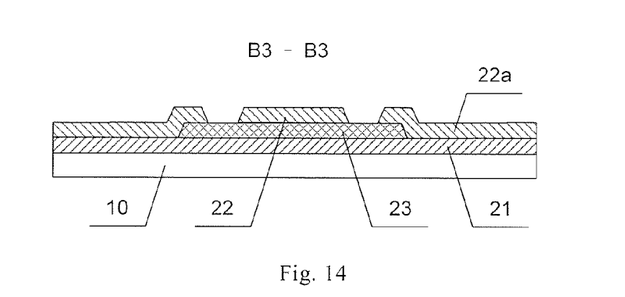
FIG. 14 is a sectional view taken along line B3-B3 in FIG. 12.

FIG. 12 is a plan view after a second patterning process in the first embodiment of the touch screen according to the invention, in which only one touch region is shown. FIG. 13 is a sectional view taken along line A3-A3 in FIG. 12 and FIG. 14 is a sectional view taken along line B3-B3 in FIG. 12.

On the substrate with the pattern shown in FIG. 4, a second metal film is deposited by a magnetron sputtering method or a thermal evaporation method. The second metal film may be a single-layer film or a composite film of multiple layers. Then, the second metal film is patterned by using a normal mask to form the second signal lines 22. The second signal lines 22 have a separate and discontinuous structure and each comprises first segments each formed between two adjacent first signal lines 21 and second segments each formed on one sensing electrode 23, as shown in FIG. 12 to FIG. 14. In this patterning process, preferably, a process line 22a is simultaneously formed on each of the first signal lines 21 so that the first signal lines 21 are prevented from being damaged during forming the second signal lines 22. The process line 22a each is horizontally provided and has a separate and discontinuous structure. In addition, the process line 22a is formed on the corresponding first signal line 21 and the end portions thereof are provided or lapped on the corresponding sensing electrodes 23. In FIG. 12, the process line 22a constitutes a portion of the first signal line 21.

Figure 15:
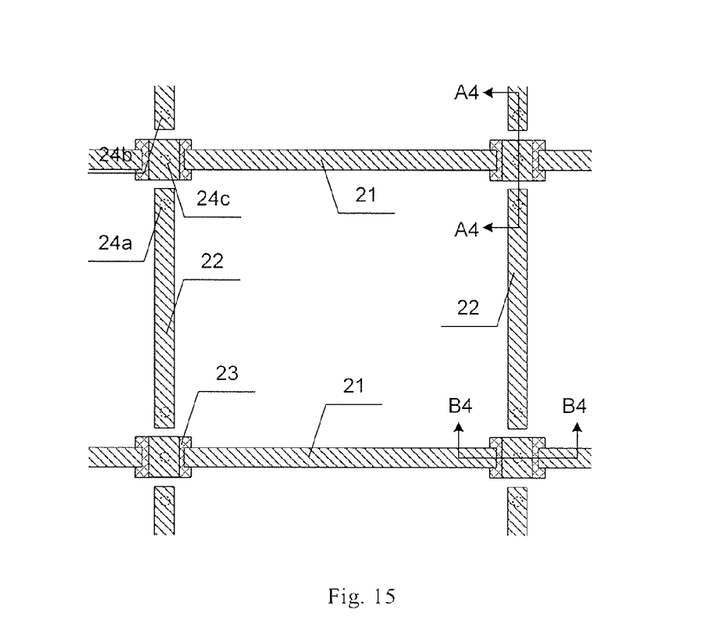
FIG. 15 is a plan view after a third patterning process in the first embodiment of the touch screen according to the invention.
Figure 16:
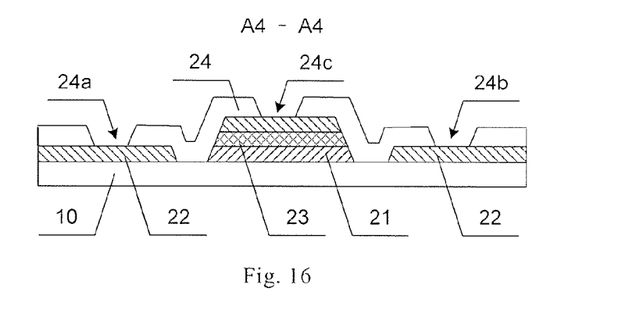
FIG. 16 is a sectional view taken along line A4-A4 in FIG. 15.
Figure 17:
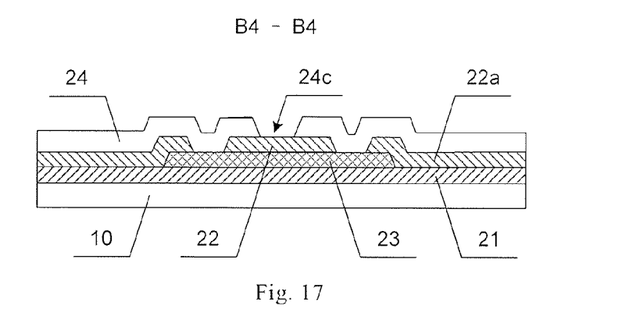
FIG. 17 is a sectional view taken along line B4-B4 in FIG. 15.

FIG. 15 is a plan view after a third patterning process in the first embodiment of the touch screen according to the invention, in which only one touch region is shown. FIG. 16 is a sectional view taken along line A4-A4 in FIG. 15 and FIG. 17 is a sectional view taken along line B4-B4 in FIG. 15. On the substrate with the pattern shown in FIG. 12, an insulating layer 24 is deposited by a plasma enhanced chemical vapor deposition (PECVD) method. The insulating layer 24 is patterned by using a normal mask to form first via holes 24a, second via holes 24b and third via holes 24c, as shown in FIG. 15 to FIG. 17. Each first via hole 24a is provided on one end portion of the first segment of one second signal line 22 formed between two adjacent first signal lines 21, each second via hole 24b is provided on the other end portion of the first segment of the second signal line 22 formed between two adjacent first signal lines 21, and each third via hole 24c is provided on the second segment of the second signal line 22 formed on the corresponding sensing electrode 23.

Finally, on the substrate with the pattern shown in FIG. 15, a third metal film is deposited by a magnetron sputtering method or a thermal evaporation method. The third metal film is patterned by using a normal mask to form the connection bars 25. One end of a connection bar 25 is connected with the first segment of one second signal line 22 on one side of the corresponding first signal line 21 through the corresponding first via hole 24a, the other end of the connection bar 25 is connected with the first segment of the second signal line on the other side of the corresponding first signal line 21 through the corresponding second via hole 24b, and the central portion of the connection bar 25 is connected with the second segment of the second signal line 22 on the sensing electrode 23 through the corresponding third via hole 24c, and thus the segments of the second signal line 22 are connected with each other, as shown in FIG. 1 to FIG. 3.

Figure 18:
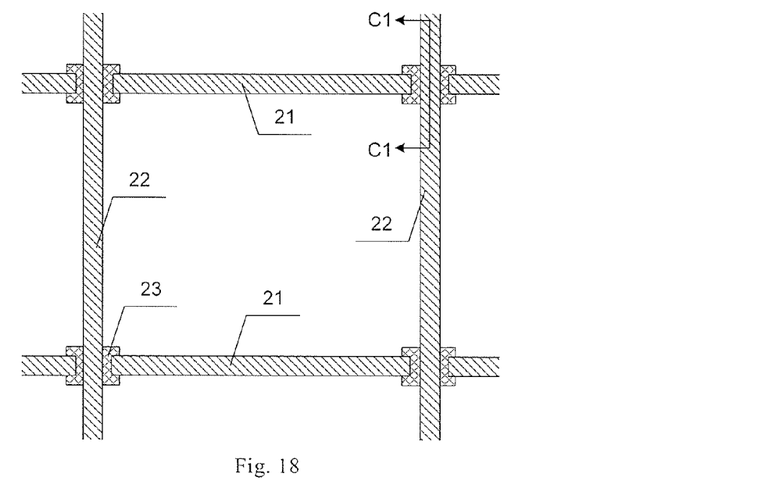
FIG. 18 is a view showing a second embodiment of a touch screen according to the invention.
Figure 19:
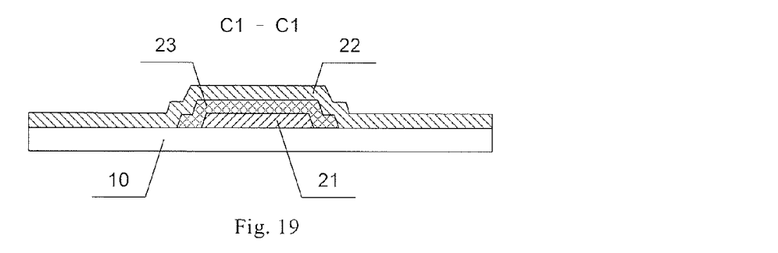
FIG. 19 is a sectional view taken along line C1-C1 in FIG. 18.

FIG. 18 is a view showing a second embodiment of a touch screen according to the invention, in which only one touch region is shown. FIG. 19 is a sectional view taken along line C1-C1 in FIG. 18. As shown in FIG. 18 and FIG. 19, the main structure and operation principle of the touch screen in this embodiment are similar to those in the first embodiment except that both of the first signal lines 21 and the second signal lines 22 have an integral and continuous structure. In this embodiment, the touch screen mainly comprises the first signal lines 21, the second signal lines 22 and the sensing electrodes 23. Each of the sensing electrodes 23 is provided between one first signal line 21 and one second signal line 22 in the thickness direction of the touch screen and respectively connected with the first signal line 21 and the second signal line 22. The second signal lines 22 are provided on the sensing electrodes 23. In addition, in each overlapping region between one first signal line 21 and one second signal line 22, the width of the sensing electrode 23 is larger than that of the first signal line 21 which is provided below the sensing electrode 23.

The manufacture process of the touch screen in this embodiment is described as follows. A first metal film is firstly deposited on a substrate, and the first metal film is patterned by using a normal mask to form first signal lines on the substrate. Then, a piezoelectric film is deposited, and the piezoelectric film is patterned by using a normal mask to form the sensing electrodes on the first signal lines. The width of the sensing electrodes is larger than that of the first signal lines correspondingly provided below the sensing electrodes. Next, a second metal film is deposited, and the second metal film is patterned by using a normal mask to form second signal lines. The second signal lines are provided on the sensing electrodes. Since the width of the sensing electrodes is larger than that of the first signal lines, the second signal lines are separated from the first signal lines. In addition, during forming the second signal lines, a process line is simultaneously formed on each first signal line to prevent the first signal line from being damaged. The process line is horizontally provided and has a separate and discontinuous structure. The process line is provided on the first signal line and the end portions thereof are provided or lapped on the sensing electrodes. In FIG. 18, the process line constitutes a portion of the first signal line.

Figure 20:
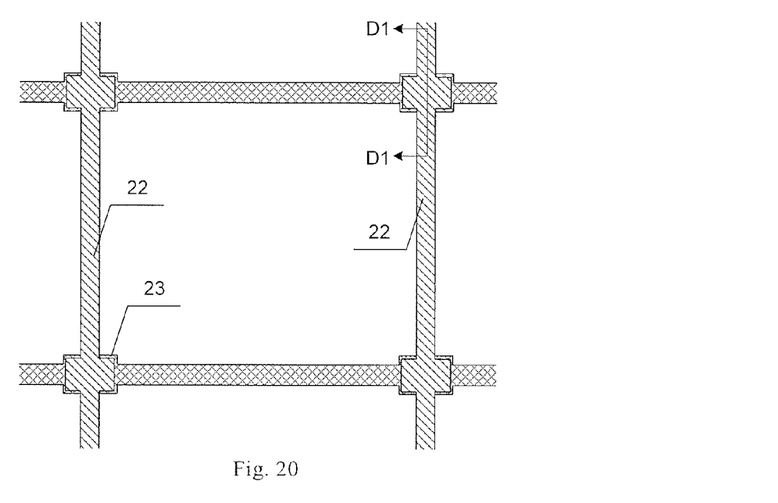
FIG. 20 is a view showing a third embodiment of a touch screen according to the invention.
Figure 21:
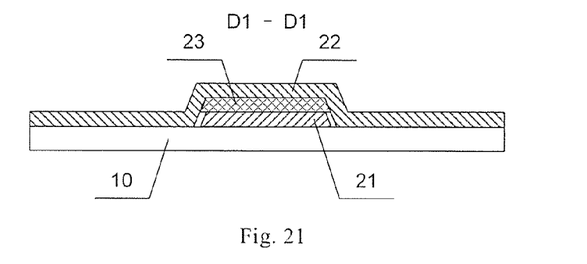
FIG. 21 is a sectional view taken along line D1-D1 in FIG. 20.

FIG. 20 is a view showing a third embodiment of a touch screen according to the invention, in which only one touch region is shown. FIG. 21 is a sectional view taken along line D1-D1 in FIG. 20. As shown in FIGS. 20 and 21, the touch screen in this embodiment mainly comprises the first signal lines 21 which are horizontally provided, the second signal lines 22 which are vertically provided, and the sensing electrodes 23. Touch regions are defined by intersecting between the first signal lines 21 and the second signal lines 22. Each of the sensing electrodes 23 is provided on whole one first signal line 21 and connected with one corresponding second signal line 22. Specifically, both of the first signal lines 21 and the second signal lines 22 have an integral and continuous structure. The first signal lines 21 are formed on the substrate 10, each of the sensing electrodes 23 is provided on the entirety of one first signal line 21, the width of the sensing electrodes 23 is larger than that of the first signal lines 21, and the second signal lines 22 are provided on the sensing electrodes 23. The operation principle of the touch screen in this embodiment is similar to that in the first embodiment. In addition, in this embodiment, although each of the sensing electrodes is provided on the entirety of one first signal line, surface charges are only generated on the pressed portion of the sensing electrode(s) and other portion of sensing electrode(s) is still in an insulating state according to the property of the piezoelectric film, and thus the coordinates of the touch point can be precisely determined.

The manufacture process of the touch screen in this embodiment is described as follows. Firstly, a first metal film and a piezoelectric film are sequentially deposited on a substrate. Next, a photoresist layer is applied on the piezoelectric film, the photoresist layer is exposed by using a normal mask, and the photoresist layer is developed to form a photoresist-completely-remained region and a photoresist-completely-removed region. The photoresist-completely-remained region corresponds to the region of a first signal line and a sensing electrode, and the photoresist-completely-removed region corresponds to the region other than the above region. Then, the piezoelectric film in the photoresist-completely-removed region is etched away by a dry-etching process to form the sensing electrode, and at this time, the etching time and etching selectivity should be properly controlled so that the first metal film is etched as little as possible during the etching of the piezoelectric film. Next, the first metal film in the photoresist-completely-removed region is etched away by a wet-etching process. At this time, the first metal film below the sensing electrode is partially etched in the width direction of the first metal film due to the isotropy characteristics of the wet-etching process, so that the width of the sensing electrode is larger than that of the first signal line below. Then, the remaining photoresist is removed. Next, a second metal film is deposited on the substrate, and the second metal film is patterned by using a normal mask to form the second signal lines. The second signal lines are provided on the sensing electrodes. In this embodiment, since the width of the sensing electrodes is larger than that of the first signal lines, the second signal lines are not connected with thus separated from the first signal lines.

It should be noted that, the touch screens in the above embodiments are described in an exemplary way but not in a limited way. In practice, various modifications, combinations or alternations can be made. For example, in the first embodiment, the second signal lines may have an integral and continuous structure extending in longitudinal direction while the first signal lines may have a separate and discontinuous structure extending in lateral direction. In addition, the sensing electrodes may be formed into other shapes depending on the design requirements and other factors.

In addition, in the first and second embodiments, during forming the second signal lines, the first signal lines can be avoided from being damaged by properly selecting the materials of the first and second signal lines. In this case, the process lines may be not formed. For example, the first metal film may be formed by a metal material with a first etching rate while the second metal film may be formed by a metal material with a second etching rate, and the second etching rate is larger than the first etching rate. That is, under the same etching conditions, the etching rate of the second metal film is larger than that of the first metal film, and thus the first signal lines can be avoided from being damaged during the etching of the second metal film (i.e., forming the second signal line). In practice, the first metal film may be formed by AlNd, and the second metal film may be formed by Mo. Under the same etching conditions, the etching rate of Mo is much larger than that of AlNd, and thus AlNd is not damaged during the etching of Mo.

In the above embodiments, because of the structures of the signal lines and the sensing electrodes, the touch screen has the advantages of simple structure, low cost, high precision, long lifetime and the like. In addition, as described above, the touch screens in the embodiments can be manufactured by using conventional apparatuses, and thus the touch screens can be manufactured in a simple process and with a low cost.

Figure 22:
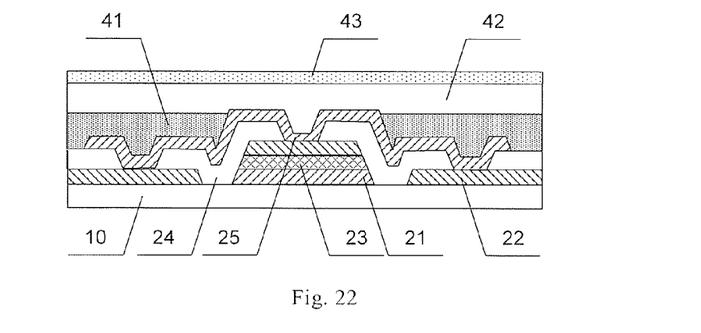
FIG. 22 is a view showing a first embodiment of a color filter substrate according to the invention.

FIG. 22 is a view showing a first embodiment of a color filter substrate according to the invention. As shown in FIG. 22, the color filter substrate in this embodiment mainly comprises a touch structural layer and a color filter structural layer. The touch structural layer is used for determining the coordinates of a touch point when being pressed, and the color filter structural layer is used for displaying a colorful image. The touch structural layer employs the structure in the first embodiment of the touch screen and comprises first signal lines 21, second signal lines 22 and sensing electrodes 23 on a substrate 10. The color filter structural layer comprises a color resin pattern 41, a planarization film 42 and a common electrode 43. The color resin pattern 41 is formed in the touch regions defined by the first signal lines and the second signal lines. The planarization film 42 is formed on the color resin pattern 41, and the common electrode 43 is formed on the planarization film 42. In an example, the sensing electrodes of the touch structural layer may be distributed on the color filter substrate in a predetermined manner. In addition, in order to precisely determine the coordinate of the touch point, the distribution density of the sensing electrodes can be designed depending on the required precision. Furthermore, the planarization film of the color filter structural layer in this embodiment may be replaced with another layer or omitted, and if necessary, a black matrix and the like may be provided.

The manufacture process of the color filter substrate in this embodiment comprises the manufacture process of the touch structural layer and manufacture process of the color filter structural layer. The touch structural layer may be manufactured by using the manufacturing method in the first embodiment of the touch screen according to the invention, and the color filter structural layer may be manufactured by using a conventional manufacture process. For example, the color filter structural layer in the first embodiment of the color filter substrate according to the invention may be manufactured as follows. On a substrate formed with a touch structural layer, a red resin layer is firstly applied, and then the red resin layer is exposed, developed and baked to form a red rein pattern of the color resin pattern. Similarly, a blue resin pattern and a green resin pattern of the color resin pattern are sequentially formed. In an example, the red resin pattern, the blue resin pattern and the green resin patter may be formed in another order. On the substrate with the color resin pattern, a planarization film is applied, and the planarization film covers the touch structural layer and the color resin pattern to form a flat surface. On the substrate with the planarization film, a transparent conductive film is deposited by a magnetron sputtering method or a thermal evaporation method, and the transparent conductive film is patterned by using a normal mask to form the common electrode.

Figure 23:
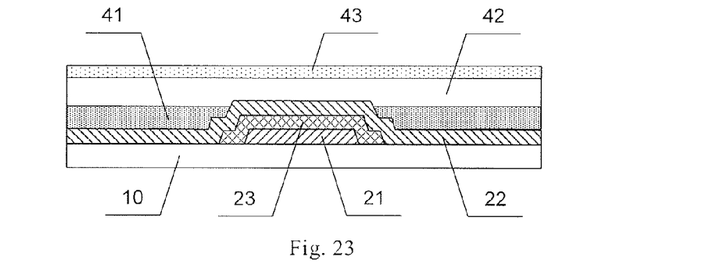
FIG. 23 is a view showing a second embodiment of a color filter substrate according to the invention.

FIG. 23 is a view showing a second embodiment of a color filter substrate according to the invention. As shown in FIG. 23, the color filter substrate in this embodiment mainly comprises the touch structural layer and the color filter structural layer. The touch structural layer in this embodiment employs the structure in the second embodiment of the touch screen and comprises the first signal lines 21, the second signal lines 22 and the sensing electrodes 23 on the substrate 10. The color filter structural layer comprises the color resin pattern 41, the planarization film 42 and the common electrode 43. The arrangement and the manufacture process of the color filter structural layer in this embodiment are similar to those in the first embodiment of the color filter substrate.

Figure 24:
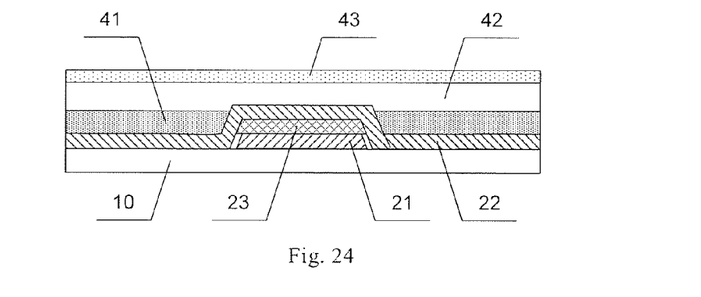
FIG. 24 is a view showing a third embodiment of a color filter substrate according to the invention.

FIG. 24 is a view showing a third embodiment of a color filter substrate according to the invention. As shown in FIG. 24, the color filter substrate in this embodiment mainly comprises the touch structural layer and the color filter structural layer. The touch structural layer in this embodiment employs the structure in the third embodiment of the touch screen and comprises the first signal lines 21, the second signal lines 22 and the sensing electrodes 23 on the substrate 10. The color filter structural layer comprises the color resin pattern 41, the planarization film 42 and the common electrode 43. The arrangement and the manufacture process of the color filter structural layer in this embodiment are similar to those in the first embodiment of the color filter substrate.

In the above embodiments of the color filter substrate, the touch structural layer is used for determining the coordinates of a touch point, the color filter structural layer is used for displaying a colorful image, and thus the touch function can be obtained for the color filter substrate. Since the touch structural layer employs the structure in the above embodiments of the touch screen, and thus, from the viewpoint of the touch function, the color filter substrate according to the embodiment of the invention has the advantages of simple structure, low cost, high precision, long lifetime and the like. In addition, compared with the conventional technology in which the touch screen is placed on and attached to the liquid crystal display, the color filter substrate according to the embodiment of the invention has a smaller weight and thickness. In addition, the touch structural layer can be used to avoid the problems of, such as, lowering the transmittance, lowering the brightness, blurring the display image and the like. In addition, the manufacture process of the color filter substrate is simple and will not cause the increase of production cost.

A method of manufacturing a touch screen according to an embodiment of the invention comprises:

Step 1 of forming a plurality of first signal lines and a plurality of sensing electrodes on a substrate, wherein each of the sensing electrodes is connected with one first signal line;

Step 2 of forming a plurality of second signal lines, wherein each of the second signal lines is connected with corresponding sensing electrodes and intersects with the first signal lines to define touch regions.

According to the method of manufacturing the touch screen, the first signal lines, the second signal lines and the sensing electrodes are formed on the substrate, and the sensing electrodes are formed by a piezoelectric material. In this way, charges are generated on the surface of one sensing electrode when the sensing electrode is pressed, and therefore the coordinates of the touch point can be determined. In addition, the touch screen according to the embodiment of the invention can be manufactured by using conventional apparatuses, and thus the touch screen according to the embodiment of the invention can be manufactured in a simple process and with low cost.

In the above method of manufacturing a touch screen, the Step 1 and Step 2 may be performed in various ways, and three examples of the method of manufacturing the touch screen are described below.

A first example of the method of manufacturing the touch screen comprises:

Step 11 of sequentially depositing a first metal film and a piezoelectric film;

Step 12 of applying a photoresist layer on the piezoelectric film, exposing the photoresist layer by using a half-tone mask or a gray-tone mask, and performing a developing process to form a photoresist-completely-remained region, a photoresist-completely-removed region and a photoresist-partially-remained region, wherein the photoresist-completely-remained region corresponds to the region of the sensing electrodes, the photoresist-partially-remained region corresponds to the region of the first signal lines other than the sensing electrodes, and the photoresist-completely-removed corresponds to the region other than the above regions, Step 13 of etching away the piezoelectric film and the first metal film in the photoresist-completely-removed region by a first etching process to form the first signal lines;

Step 14 of removing the photoresist layer in the photoresist-partially-remained region by an asking process to expose the piezoelectric film in this region;

Step 15 of etching away the piezoelectric film in the photoresist-partially-remained region by a second etching process to form the sensing electrodes and removing remaining photoresist;

Step 16 of depositing a second metal film and forming the second signal lines and process lines by a patterning process with a normal mask, wherein the second signal lines intersect with the first signal lines, the second signal lines have a separate and discontinuous structure and each comprises first segments each formed between two adjacent first signal lines and second segments each formed on one corresponding sensing electrode. Each of the process lines is provided on a corresponding first signal line and has a separate and discontinuous structure and the end portions thereof are provided or lapped on the corresponding sensing electrodes.

Step 17 of depositing an insulating layer and patterning the insulating layer by using a normal mask to form first via holes, second via holes and third via holes in the insulating layer, wherein a pair of the first via hole and the second via hole are respectively provided on the end portions of the first segment of the second signal line formed between two adjacent first signal lines, and the third via holes are provided on the second segments of the second signal lines formed on the sensing electrodes;

Step 18 of depositing a third metal film and patterning the third metal film by using a normal mask to form connection bars, wherein the first segments and the second segments of the second signal lines are connected with each other by the connection bars through the first via holes, the second via holes and the third via holes.

The method in this example may be used to manufacture the structure in the first embodiment of the touch screen, and the details thereof have been described with reference to FIG. 4 to FIG. 17.

A second example of the method of manufacturing the touch screen comprises:

Step 21 of depositing a first metal film on a substrate, and patterning the first metal film by using a normal mask to form the first signal lines;

Step 22 of depositing a piezoelectric film, and patterning the piezoelectric film by using a normal mask to form the sensing electrodes, wherein each of the sensing electrodes is formed on one first signal line and provided in an overlapping region of the first signal line and one corresponding second signal line to be formed later, and the width of the sensing electrode is larger than that of the first signal line;

Step 23 of depositing a second metal film, and patterning the second metal film to form the second signal lines and process lines, the second signal lines are formed on the sensing electrodes and intersect with the first signal lines, the process lines are provided on the first signal lines, and each of the process lines has a separate and discontinuous structure and the end portions thereof are provided on corresponding sensing electrodes.

The method in this example may be used to manufacture the structure in the second embodiment of the touch screen.

A third example of the method of manufacturing the touch screen comprises:

Step 31 of sequentially depositing a first metal film and a piezoelectric film on a substrate;

Step 32 of applying a photoresist layer on the piezoelectric film;

Step 33 of exposing the photoresist layer by using a normal mask and performing a developing process to form a photoresist-completely-remained region and a photoresist-completely-removed region, wherein the photoresist-completely-remained region corresponds to the region of the first signal lines and the sensing electrodes, and the photoresist-completely-removed region corresponds to the region other than the above region;

Step 34 of etching away the piezoelectric film in the photoresist-completely-removed region by a dry-etching process to form the sensing electrodes;

Step 35 of etching away the first metal film in the photoresist-completely-removed region by a wet-etching process to form the first signal lines and removing remaining photoresist layer, wherein the first metal film below the sensing electrodes is partially etched in the width direction of the first metal film;

Step 36 of depositing a second metal film, and patterning the second metal film by using a normal mask to form the second signal lines, wherein the second signal lines are provided on the sensing electrodes and intersect with the first signal lines.

The method in this example may be used to manufacture the structure in the third embodiment of the touch screen.

A method of manufacturing a color filter substrate according to an embodiment of the present invention comprises:

Step 10 of forming a touch structural layer on a substrate; and

Step 20 of forming a color filter structural layer on the touch structural layer.

The touch structural layer may be manufactured by using a manufacturing method embodiment of the touch screen according to the invention, and the color filter structural layer may be manufactured by using a conventional manufacture process. For example, the color filter structural layer may be manufactured as follows. On the substrate formed with a touch structural layer, a red resin layer is firstly applied, and then the red resin layer is exposed, developed and baked to form a red rein pattern of the color resin pattern. Similarly, a blue resin pattern and a green resin pattern of the color resin pattern are sequentially formed. In an example, the red resin pattern, the blue resin pattern and the green resin patter may be formed in another order. On the substrate with the color resin pattern, the planarization film is applied, and the planarization film covers the touch structural layer and the color resin pattern to form a flat surface. On the substrate with the planarization film, a transparent conductive film is deposited by a magnetron sputtering method or a thermal evaporation method, and the transparent conductive film is patterned by using a normal mask to form a common electrode.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A touch screen, comprising:
a substrate;
a plurality of first signal lines and a plurality of second signal ones forming on the substrate and intersecting with each other to define a plurality of touch regions;
a plurality of sensing electrodes, forming on the substrate and each of the sensing electrodes being connected between one first signal line and one second signal line, wherein the sensing electrodes are formed by a piezoelectric material, and charges are generated on at least one of the sensing electrodes when the sensing electrode is pressed, so that detecting signals for determining coordinates of a touch point are generated on the first signal line and the second signal line that correspond to the sensing electrode, and
wherein each of the sensing electrodes is formed in an overlapping region of the corresponding first signal line and the corresponding second signal line and provided between the corresponding first signal line and the corresponding second signal line in a thickness direction of the touch screen.

2. The touch screen according to claim 1, wherein each of the first signal lines has an integral and continuous structure, each of the second signal lines has a separate and discontinuous structure, each of the second signal lines comprises first segments each formed between two adjacent first signal lines and second segments formed on corresponding sensing electrodes, the first and second segments of the second signal line adjacent to each other are connected by connection bars.

3. The touch screen according to claim 2, wherein an insulating film is formed on the second signal ones, a first via hole, a second via hole and a third via hole are provided in the insulating film for a pair of the first and second segments of one second signal line, the first via hole and the second via hole are respectively provided on both end portions of the first segment of the pair, the third via hole is provided on the second segment of the pair, the connection bar for the pair is formed on the insulating layer so that the first and second segments of the pair are connected with each other by the connection bar through the first via hole, the second via hole and the third via hole.

4. The touch screen according to claim 1, wherein the first signal lines and the second signal lines both have an integral and continuous structure.

5. The touch screen according to claim 4, wherein the width of the sensing electrodes is larger than that of the first signal lines.

6. The touch screen according to claim 1, wherein the first signal lines and the second signal lines both have an integral and continuous structure, and each of the sensing electrodes is formed on the entirety of one corresponding first signal one.

7. The touch screen according to claim 6, wherein the width of the sensing electrode is larger than that of the first signal ones.

8. A color filter substrate, comprising:
a touch structural layer comprising:
a substrate;
a plurality of first signal lines and a plurality of second signal ones forming on the substrate and intersecting with each other to define a plurality of touch regions;
a plurality of sensing electrodes, forming on the substrate and each of the sensing electrodes being connected between one first signal line and one second signal line, wherein the sensing electrodes are formed by a piezoelectric material and charges are generated on at least one of the sensing electrodes when the sensing electrode is pressed, so that detecting signals for determining coordinates of a touch point are generated on the first signal line and the second signal line that correspond to the sensing electrode, and wherein each of the sensing electrodes is formed in an overlapping region of the corresponding first signal line and the corresponding second signal line and provided between the corresponding first signal line and the corresponding second signal line in a thickness direction of the touch screen; and a color filter structural layer formed on the touch structural layer.

9. The color filter substrate according to claim 8, wherein the color filter structural layer comprises a color resin pattern formed in each of the touch regions defined by the first and second signal lines.

10. The color filter substrate according to claim 9, wherein the color filter structural layer further comprises a planarization film formed on the color resin pattern.

11. The color filter substrate according to claim 10, wherein the color filter structural layer further comprises a common electrode formed on the planarization film.

\* \* \* \* \*